US012600479B2

(12) United States Patent
Cloet et al.

(10) Patent No.: US 12,600,479 B2
(45) Date of Patent: Apr. 14, 2026

(54) MANUALLY-CONVERTIBLE SEAT FOR AN AIRCRAFT PASSENGER

(71) Applicant: AIRBUS ATLANTIC, Rochefort (FR)

(72) Inventors: Frédéric Cloet, Rochefort (FR);
Laurent Vignon, Rochefort (FR);
Benoît Trillaud, Rochefort (FR)

(73) Assignee: AIRBUS ATLANTIC, Rochefort (FR)

( * ) Notice: Subject to any disclaimer, the term of this patent is extended or adjusted under 35 U.S.C. 154(b) by 69 days.

(21) Appl. No.: 18/592,927

(22) Filed: Mar. 1, 2024

(65) Prior Publication Data

US 2024/0294260 A1     Sep. 5, 2024

(30) Foreign Application Priority Data

Mar. 2, 2023     (FR) ...................................... 2301975

(51) Int. Cl.
    B64D 11/06          (2006.01)
(52) U.S. Cl.
    CPC ............................... B64D 11/0641 (2014.12)
(58) Field of Classification Search
    CPC .............. B64D 11/0641; B60N 2/2213; B60N 2/2209; B60N 2/23; B60N 2/34
    USPC ............................................................ 5/37.1
    See application file for complete search history.

(56) References Cited

U.S. PATENT DOCUMENTS

| | | | | |
|---|---|---|---|---|
| 4,696,515 A | * | 9/1987 | Heesch ................ | B60N 2/2213 |
| | | | | 297/354.12 |
| 2012/0038196 A1 | * | 2/2012 | Lawson ............. | B64D 11/0641 |
| | | | | 297/354.12 |
| 2019/0127070 A1 | * | 5/2019 | Oleson ............... | B64D 11/0621 |
| 2021/0323679 A1 | | 10/2021 | Pence et al. | |
| 2022/0332425 A1 | * | 10/2022 | Jérôme .............. | B64D 11/0641 |

FOREIGN PATENT DOCUMENTS

| | | |
|---|---|---|
| EP | 0404628 | 12/1992 |
| EP | 0234438 | 4/1993 |
| EP | 1044878 | 10/2000 |
| EP | 1352828 | 10/2003 |
| EP | 3480111 | 6/2022 |
| EP | 4074600 | 10/2022 |
| FR | 696380 | 12/1930 |
| WO | 2012024159 | 2/2012 |

OTHER PUBLICATIONS

Preliminary Search Report for application No. FR2301975 dated Nov. 7, 2023.

* cited by examiner

*Primary Examiner* — Jason D Shanske
(74) *Attorney, Agent, or Firm* — Perman & Green, LLP

(57)          ABSTRACT
A convertible seat for a passenger of an aircraft, such as an airliner, including a sitting portion and a backrest portion movable between a "sitting" position and a "laid" position, the seat including a mechanism for manual conversion between the positions, which can be actuated by a physical action of the passenger by means of an unlocking lever, without any electrical energy input, in that the mechanism comprises load-compensating means to assist the passenger during the conversion of the seat.

10 Claims, 6 Drawing Sheets

[Fig. 1]
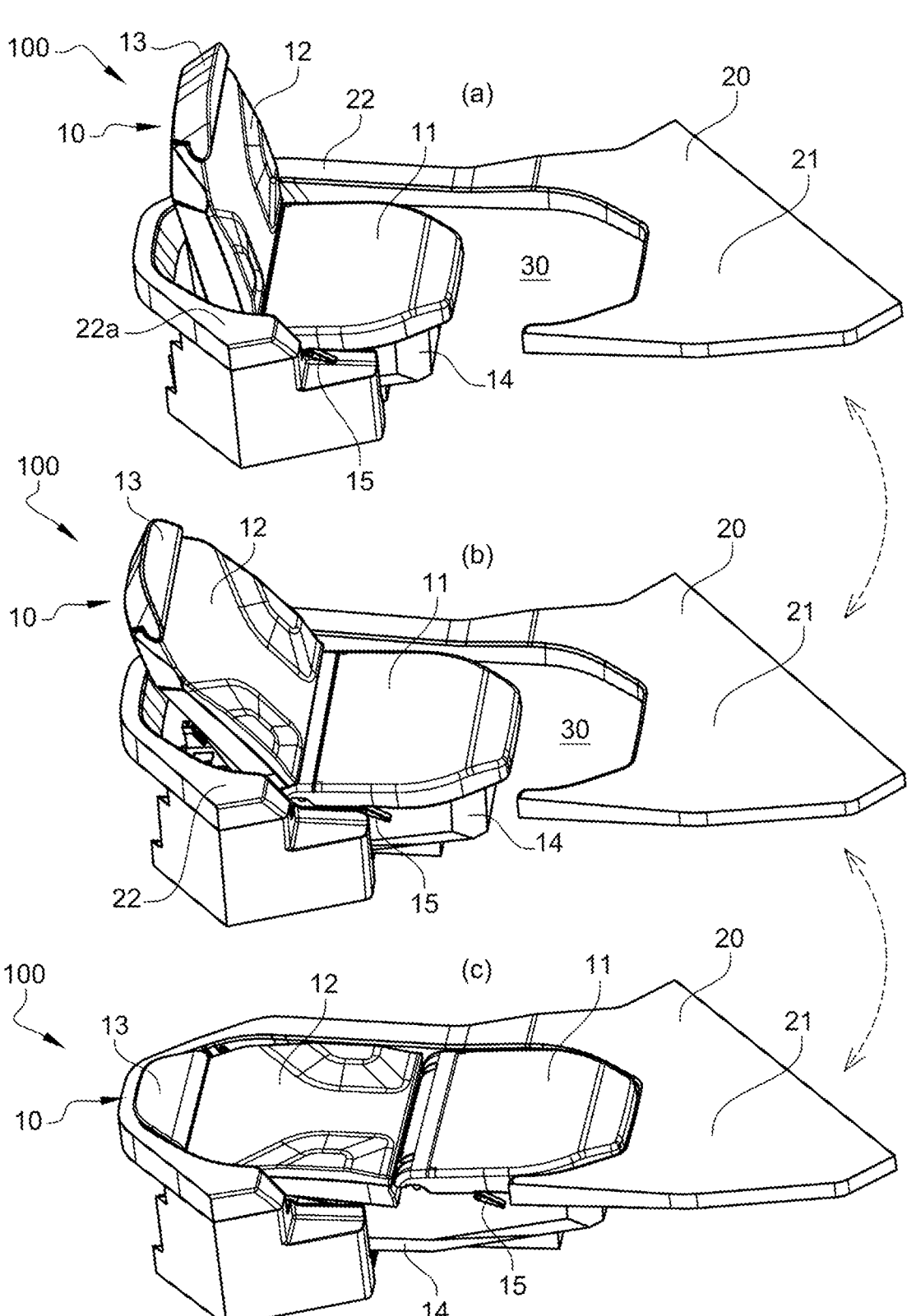

[Fig. 2]
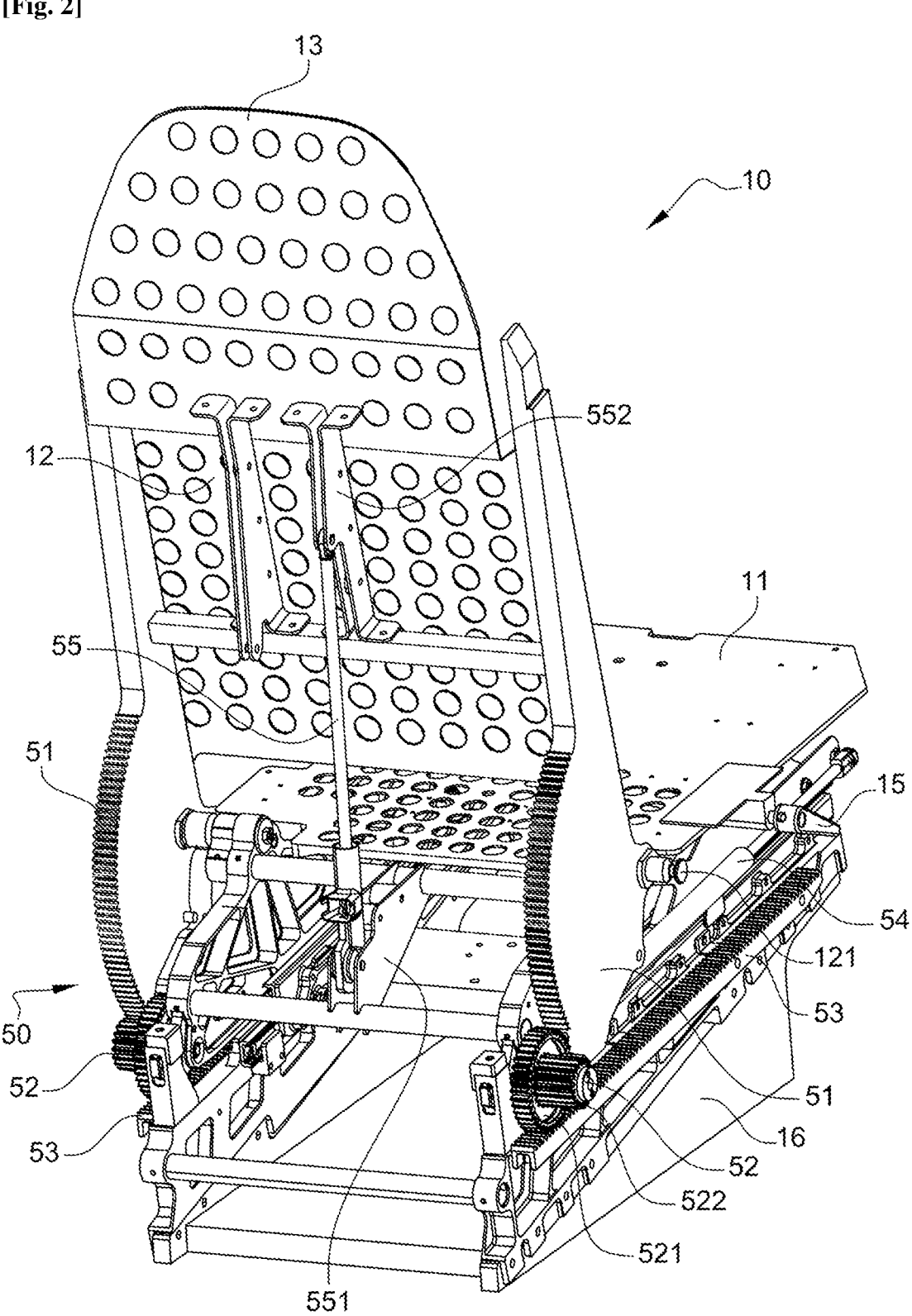

[Fig. 3]
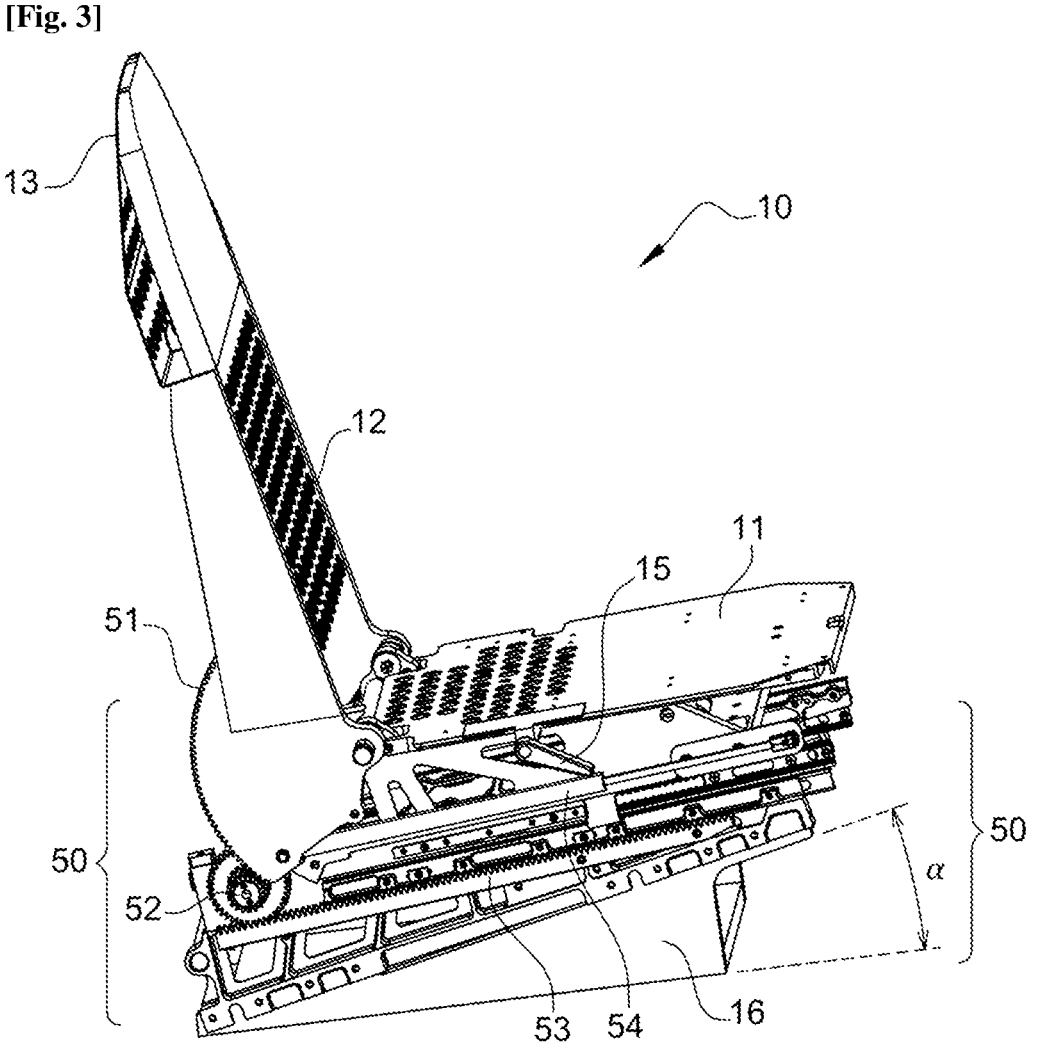

[Fig. 4]
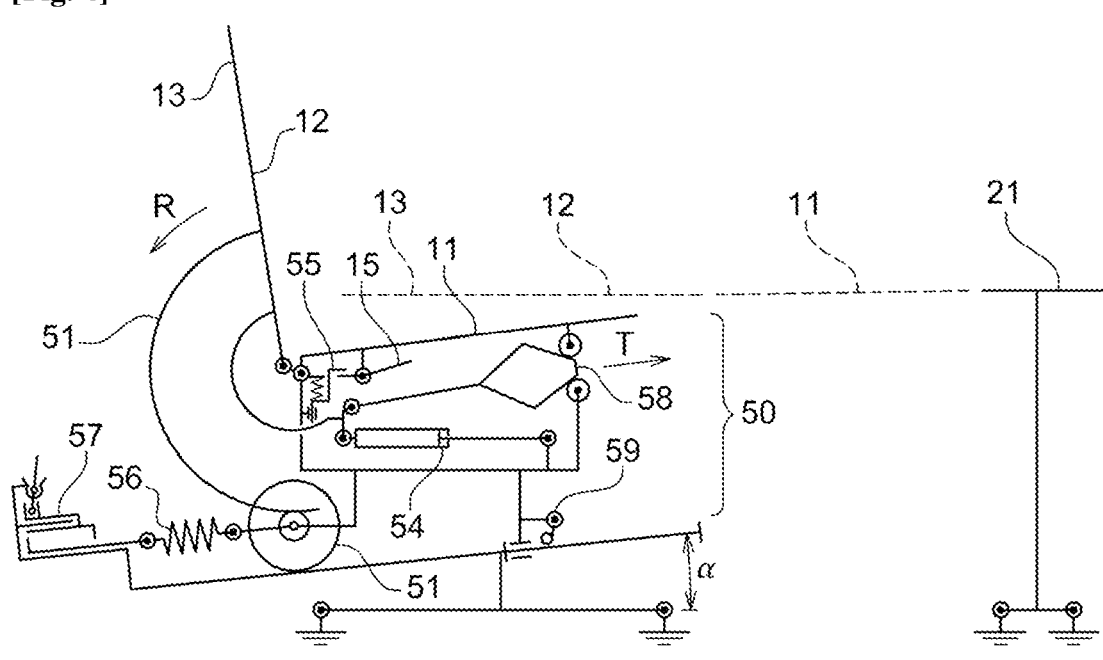
[Fig. 5]
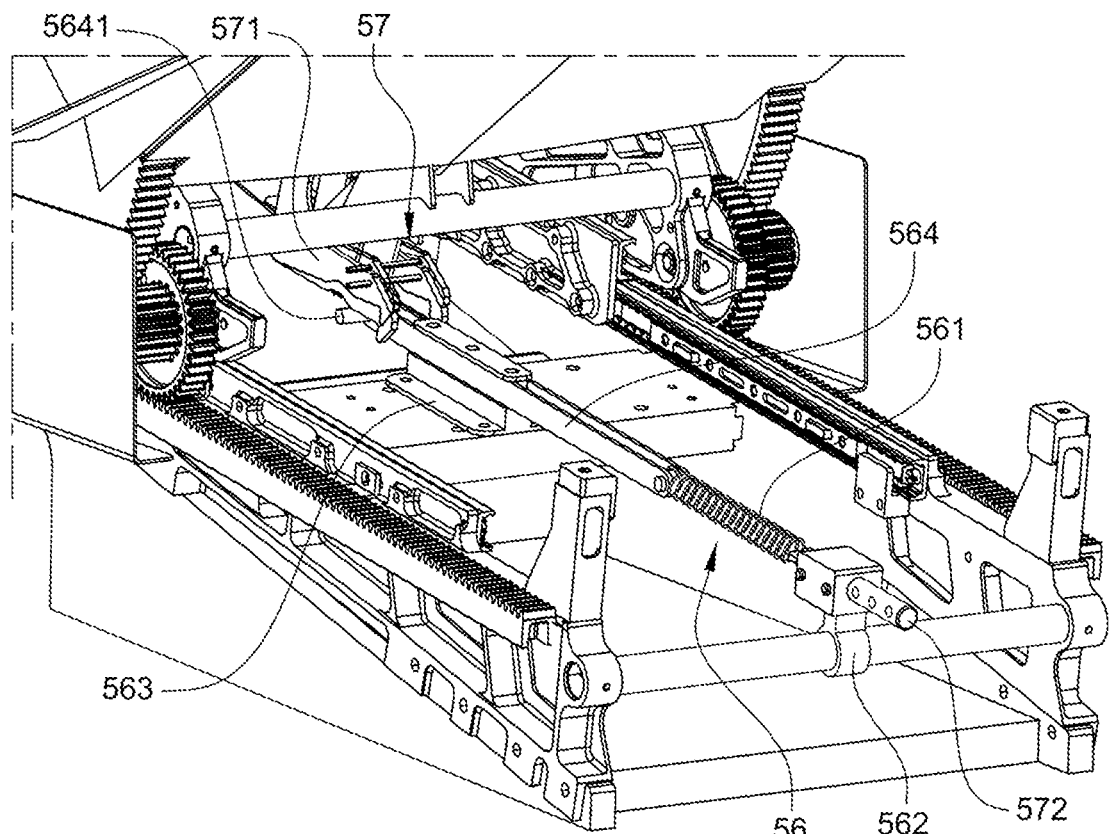

[Fig. 6a]
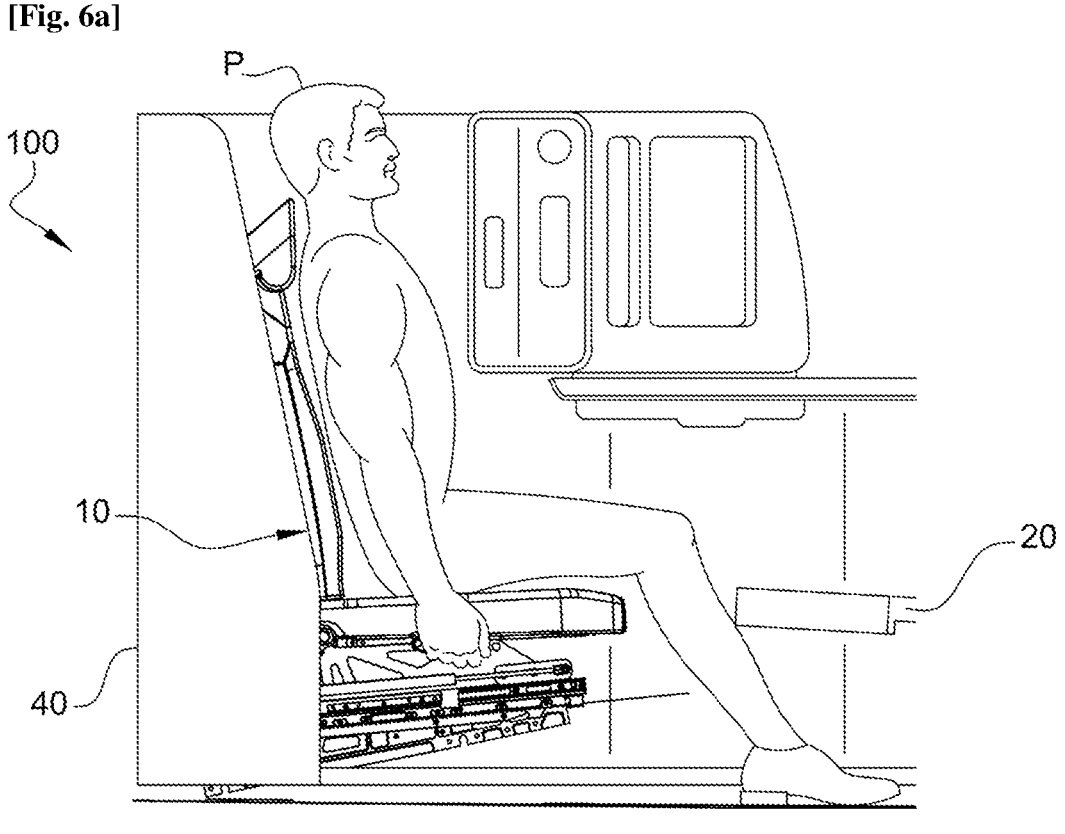
[Fig. 6b]
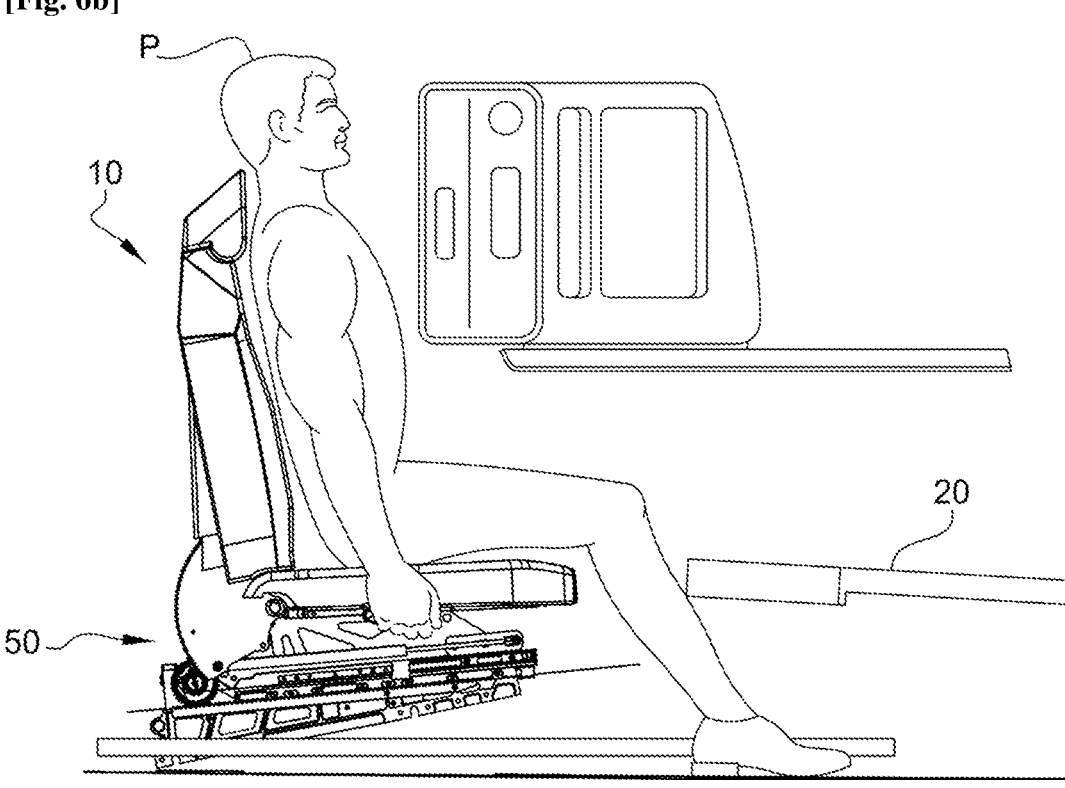

[Fig. 7]
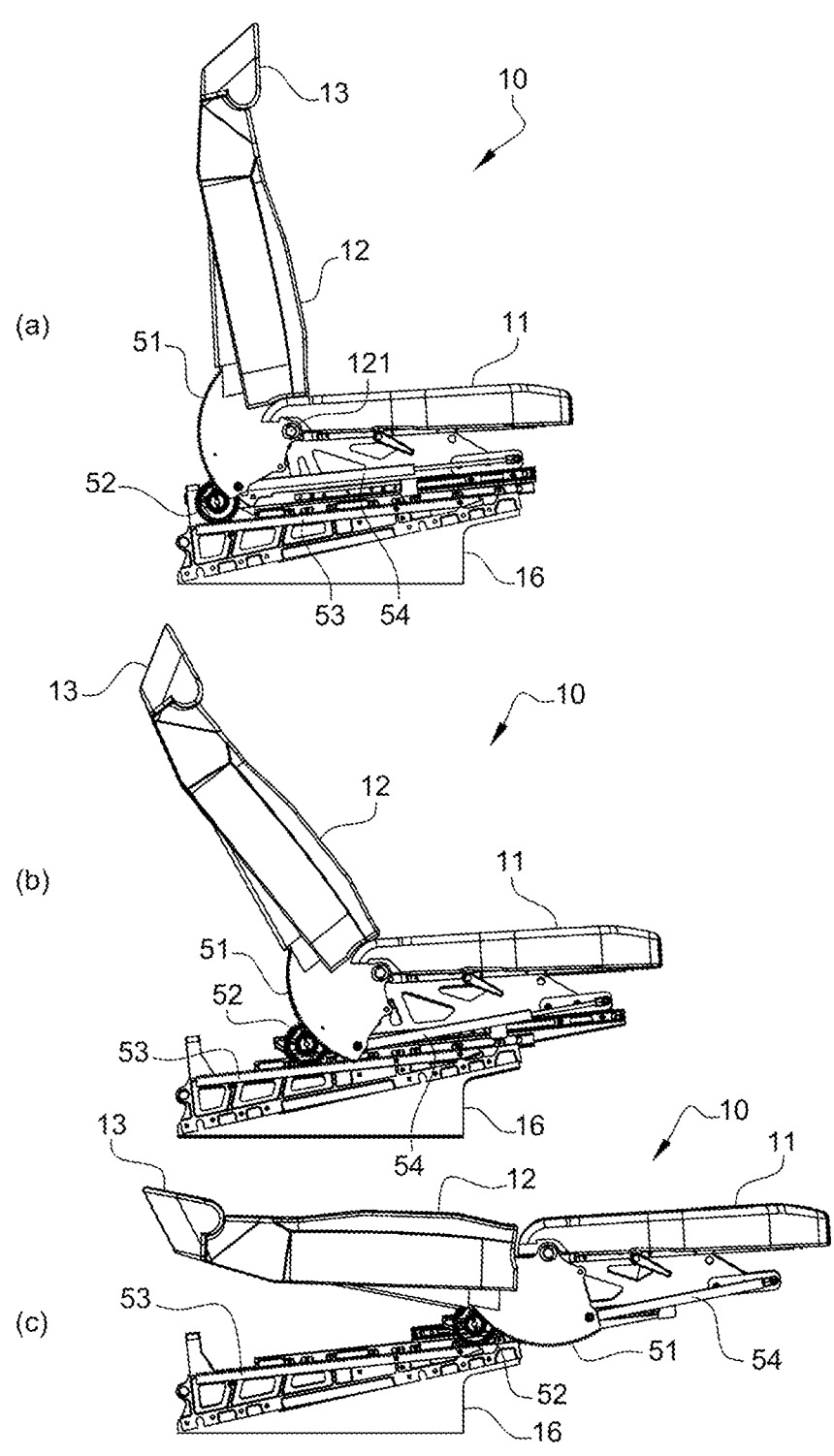

MANUALLY-CONVERTIBLE SEAT FOR AN AIRCRAFT PASSENGER

CROSS-REFERENCE TO RELATED APPLICATIONS

This application is based on and claims priority under 35 U.S.C. § 119 to French Patent Application No. FR2301975, filed on Mar. 2, 2023, in the French Intellectual Property Office, the disclosure of which is incorporated by reference herein in its entirety.

BACKGROUND

Field

The present disclosure relates to the field of seats for aircraft passengers, in particular seats convertible into beds used in high classes (business class and first class), and relates more particularly to a seat that is manually convertible, without any motor drive, thanks to a mechanism that can be easily actuated through a physical action of the passenger.

Thus, the present disclosure aims at energy and weight savings in passenger transport aircrafts, and therefore a reduction in the operating costs of airline companies.

Brief Description of Related Developments

Convertible seats for aircraft passengers, such as airlines, are well-known and widespread, with many manufacturers offering different solutions. These seats, also called "chairs", are generally designed to offer several positions to the passenger, in particular the sitting and laid positions, as well as intermediate inclined positions for more comfort.

Therefore, convertible seats are important pieces of equipment to guarantee the comfort of the passengers during long flights. However, the current solutions for conversion of the seats from a sitting position into a laid position often involve the use of complex motor-driven mechanisms that have significant drawbacks.

Sometimes, these motor-driven mechanisms require sophisticated mechanical and electrical designs, with essential parts such as electric motors, reduction gears, transmission shafts, etc. When designing these complex systems, engineers should consider many factors, such as the reliability, the durability, the weight and the cost. For example, the used electric motors should be powerful enough to perform the conversion operation, while being small and light enough in order not to add an additional weight to the aircraft.

Furthermore, the motor-driven mechanisms are often more susceptible to breakdowns than mechanisms that are not motor-driven, which could result in costly flight delays and inconveniences for the passengers. In the event of a breakdown, repairing a motor-driven mechanism might be complex and require a long intervention time.

There are numerous solutions in the field of convertible seats, mostly with minor improvements to a common base principle. For example, these improvements may concern the combination of the movements of the different movable portions of the seat (sitting portion, backrest portion, legrest, etc.), the synchronisation of these movements, the reduction of the noise of the conversion mechanisms, the ease of use by the passenger, etc.

Document EP1044878A2 describes a convertible seat for an aircraft passenger comprising a fixed portion to support the seat adjacent to a floor of the aircraft; a movable portion comprising a sitting portion and a backrest portion; guide means to guide the movement of the movable portion relative to the fixed portion between a vertical position and a fully inclined position; and drive means which can be actuated selectively to cause a progressive movement of the movable portion between said positions. In this solution, the guide means comprise at least one elongate track provided on the fixed portion, which track is equipped with a rack; and the drive means comprise a pinion which engages with the rack and a drive and locking unit to drive the pinion. The drive and locking unit comprises an electric motor with a selective operation which is mounted on the backrest portion, which motor is adapted to drive two substantially coaxial drive shafts, each drive shaft carrying a pinion at one end of the shaft away from the motor.

This solution aims to overcome some shortcomings of the prior seats, but it also involves a complex design which has the same drawbacks as those discussed hereinabove. In addition, the proposed mechanism does not guarantee a proper synchronisation of the movements of the movable portion.

In turn, document EP1352828A1 describes a convertible seat for an aircraft passenger, comprising a backrest portion and a sitting portion pivotably mounted relative to the backrest portion, a support structure of the sitting portion and of the backrest portion, the backrest portion being connected to the support structure by a pivot connection, as well as a legrest connected by a pivot connection to the front end of the sitting portion. This seat includes synchronisation mechanical means capable of synchronising the movements of the backrest portion and of the legrest. This seat also includes control means which comprise an electronic control box cooperating with the actuators and further cooperating with means that can be actuated by the passenger to set the position of the seat.

Like the prior art, this solution proposes an electronically-controlled motor-driven mechanism and is also concerned by the drawbacks due to this motor drive.

Document US2021323679A1 describes an aircraft seat comprising an upper assembly, a lower assembly and an actuation assembly configured to actuate the upper assembly relative to the lower assembly. The lower assembly comprises at least one spring coupled to a base with an inclined actuation surface configured to ensure that the upper assembly is at a reduced height when it is in a bed position. The compression of this spring may be configured to counterbalance a load inside the aircraft seat and to generate a controlled actuation of the upper assembly from a vertical position into the bed position. A biasing force supplied by the spring could assist the actuation assembly during the actuation of the upper assembly from the reduced height of the bed position into the vertical position.

This solution includes a motor drive in the actuation assembly, but comprises an assist spring to control the conversion of the seat.

Besides the aeronautical industry, there are convertible chairs, in particular home or office chairs which can be converted in a laid position. These types of chairs are generally called "relaxation chairs" or "resting chairs". They may have different conversion mechanisms, such as motor-driven mechanisms, manual mechanisms, or hydraulic mechanisms.

Motor-driven relaxation chairs often use electric motors to control the position of the backrest portion and of the legrest. Users can set the positions by pressing on a button or by using a remote-control. Manual relaxation chairs are equipped with unlocking levers which enable the users to manually set the position of the backrest portion and of the legrest. Hydraulic relaxation chairs use a hydraulic cylinder system to set the position.

To the best of the Applicant's knowledge, there is no solution that proposes a seat for an aircraft passenger, which is manually convertible without any motor drive and which preserve the same level of comfort as that desired by high-class passengers.

Hence, it has become necessary to develop convertible seats that are economical in terms of cost and weight, while guaranteeing an optimum level of comfort and safety for the passengers. An alternative solution consists in designing a simple and effective manual conversion mechanism which requires no electrical energy to function.

By adopting such a manual conversion mechanism, it is possible to considerably reduce the costs and the total weight of the aircraft, while improving the reliability and the durability of the seat. Such a system would be easy to maintain and to repair, while offering a more comfortable and pleasant travel experience to the passengers.

SUMMARY

The present disclosure aims to overcome all or part of the drawbacks of the prior art set out hereinbefore by providing a 100% mechanical solution of a convertible seat for an aircraft passenger.

An aim of the present disclosure is to be able to switch a chair from a sitting position into a comfortable laid position (bed) through an action that is intuitive, simple and easy to passengers of different sizes.

To this end, an object of the present disclosure is a convertible seat for a passenger of an aircraft, such as an airliner, including a sitting portion and a backrest portion movable between a "sitting" position and a "laid" position, remarkable in that it includes a mechanism for manual conversion between said positions, which can be actuated by a physical action of the passenger by means of an unlocking lever, without any electrical energy input, in that said mechanism comprises load-compensating means to assist the passenger during the conversion of the seat.

The manual conversion mechanism can be activated by the passenger himself/herself, using the unlocking lever, to switch from one position to another.

The load-compensating means for assisting the passenger during the conversion of the seat may include springs, dampers, hydraulic or pneumatic cylinders, or other devices to help relieve the pressure on the joints and the muscles of the passenger when he/she switches from one position to another.

Advantageously, the seat does not comprise any motor-driven mechanism to actuate any movement of the sitting portion or of the backrest portion.

According to one aspect, the mechanism comprises, on each lateral side of the seat, a first pinion fastened to the backrest portion, a second pinion coupled to the first pinion and a rack cooperating with the second pinion to drive the sitting portion in translation under the effect of the rotation of the first pinion.

More particularly, each second pinion is staggered and comprises a large-diameter wheel coupled to a rack and a small-diameter wheel coupled to a first pinion.

According to one aspect, the load-compensating means comprise a gas spring fastened between the sitting portion and the backrest portion to assist the passenger in a rotational movement of said backrest portion.

According to one aspect, the load-compensating means comprise at least one tension spring fastened between the sitting portion and a fixed structure of the seat to assist the passenger in a translational movement of said sitting portion.

According to one aspect, the mechanism further comprises a blocking means fastened between the sitting portion and the backrest portion to hold the seat at any position between the sitting position and the laid position.

For example, the blocking means is a linear positioner.

Another object of the present disclosure is a seat unit for a passenger of an aircraft, comprising a seat as disclosed, an extension element comprising an ottoman and a separation shell.

Another object of the present disclosure is an aircraft comprising at least one such a seat unit.

The fundamental concepts of the disclosure having just been disclosed hereinabove in their most elementary form, other details and features will appear more clearly upon reading the following description and with reference to the appended drawings, giving as a non-limiting example, an aspect of a manually-convertible seat for an aircraft passenger, in accordance with the principles of the disclosure.

BRIEF DESCRIPTION OF THE FIGURES

The figures are given for merely illustrative purposes for a better understanding of the disclosure without limiting its scope. The different elements may be schematically illustrated and are not necessarily plotted to scale. In all figures, identical or equivalent elements bear the same reference numeral.

Thus, are illustrated in:

FIG. 1 perspective views of a manually-convertible seat according to an aspect, in different position, sitting position in (a), intermediate position in (b) and laid position in (c);

FIG. 2 a perspective back view of the seat without its lining elements, revealing the manual conversion mechanism;

FIG. 3 a slightly profile view of the seat showing the cooperation between the set of pinions and the rack;

FIG. 4 a simplified kinematic diagram of the seat with a few optional elements;

FIG. 5 a partial perspective back view of the seat, with the translation compensating means apparent;

FIG. 6a an illustration of a passenger seated in a seat unit comprising the seat according to the disclosure;

FIG. 6b a partial detail view of FIG. 6a;

FIG. 7 profile views of the seat with its conversion mechanism apparent, in different positions, sitting position (a), intermediate position in (b) and laid position in (c).

DETAILED DESCRIPTION

It should be noted that some technical elements well-known to a person skilled in the art are herein described to avoid any insufficiency or ambiguity in understanding the present disclosure.

In the aspect described hereinafter, reference is made to a seat that is manually convertible between at least two seated positions of the passenger, primarily intended for furnishing aircraft cabins. This non-limiting example is given for a better understanding of the disclosure and does not exclude the use of the seat in other suited transportation means.

It should be recalled that the main objective of the present disclosure is to provide an alternative to get rid of conventional electrically-driven mechanisms which currently equip the convertible seats of aircrafts.

In the present description, the term "manual" and the derived terms refer to what requires a physical action or involves a human intervention to be completed, in contrast with automatic. Thus, a manual conversion of a seat refers to a conversion that is done entirely through the physical action of the passenger.

FIG. 1 illustrates a seat 10 according to the disclosure, in a seat unit 100 also comprising an extension element 20 and a non-illustrated separation shell.

The seat 10 is manually-convertible and can occupy a "sitting" position, at least one so-called "rest" intermediate position and a "laid" position, said positions being respectively illustrated in (a), (b) and (c) in FIG. 1.

All these positions are stable and switching from one position to another is performed through a simple movement of the passenger as will be described later on.

When it is installed in an aircraft cabin, the seat 10 is partially surrounded by the separation shell which defines a private space of the passenger in which different amenities are arranged, as is common in high-class air transport. Such a separation shell of the seat unit is described for example in document EP4074600A1 (incorporated by reference) on the name of the Applicant.

In a known manner, the seat 10 primarily comprises a sitting portion 11 and a backrest portion 12, both being movable so that the seat 10 is convertible between the sitting position, in which the backrest 12 is upright and forms a substantially perpendicular angle with the sitting portion 11, and the laid position, in which the backrest portion 12 is folded over so as to be aligned with a mean plane of the sitting portion 11 and thus form a substantially horizontal lying surface serving as a bed for the passenger.

The seat 10 continuously switches from the sitting position into the laid position, and vice versa. Between these two positions, the seat 10 can occupy at least one rest position, in which the backrest portion 12 is inclined with respect to the sitting portion 11 by an obtuse angle which is more or less large according to the comfort level desired by the passenger.

During a transition from the sitting position towards the laid position, the movement of the sitting portion 11 is primarily a forward translation along a longitudinal direction of the seat 10, from the position (a) to the position (c) as illustrated in FIG. 1, whereas the movement of the backrest portion 12 is composed of a downward curvilinear translation and of a rotation about a tilt axis. Of course, the reverse transition is accompanied with the reverse respective movements.

The seat 10 may have any shape, preferably optimised to occupy the available space and to ensure the necessary comfort to the passenger.

The seat 10 further includes a headrest 13 at the top of the backrest portion 12 and a base 14 supporting the sitting portion 11.

The extension element 20 has a shape which matches with that of the seat 10 in at least one transverse plane when the latter is in the laid position, thereby offering an additional surface to extend the laying surface, at the legs by an ottoman 21 and at the arms by lateral portions 22. In the laid position of the seat 10, the sitting portion 11, the backrest portion 12, the headrest 13 and the extension element 20 are substantially coplanar.

In the sitting or rest position, the sitting portion 11 of the seat 10 remains spaced apart from the extension element 20, thereby clearing a space 30 through which the passenger accesses or gets of his/her seat and wherein the passenger sets his/her legs when he/she is seated.

The seat 10 includes an unlocking lever 15 with which the passenger activates the manual conversion of the seat from one position to another.

FIG. 2 illustrates the seat 10 without the cushions and the lining panels so as to reveal its inner structure and its conversion mechanism 50.

The structure is partial to the extent that some elements that are not useful to the description of the disclosure are not illustrated.

A person skilled in the art will sit without any difficulty on the seat the necessary or optional elements of which are described in the case of a particular application.

The manual conversion mechanism 50 is actuated by the unlocking lever 15 which frees the movement of the seat 10, said movement being caused by the physical action of the passenger.

To this end, the mechanism 50 includes, on each lateral side of the seat 10, a set of pinions 51 and 52 ensuring the kinematic connection between the sitting portion 11 and the backrest portion 12, a rack 53 to ensure the translation of the sitting portion 11 by rolling, and at least one compensating means 54 to assist the passenger during the switch from the laid position into the sitting position.

The mechanism 50 further includes a blocking means 55, positioned in a central portion of the seat 10, to lock the position of the seat at any intermediate position.

In order to facilitate the initiation of the conversion movement from the sitting position towards a rest position or directly towards a laid position, which is done by simply pressing the back of the passenger on the backrest portion 12, the sitting portion 11 of the seat 10 is inclined to wedge the pelvis of the passenger and to avoid slipping of the passenger forwards.

Afterwards, thanks to a positive inclination by an angle $\alpha$, a ramp 16 allows limiting the initial acceleration of the movable portions of the seat 10 upon this initiation.

Indeed, the pressing of the back of the passenger allows triggering the backward tilting of the backrest portion 12 and the forward translation of the sitting portion 11. These two movements are performed simultaneously by being dependent on each other thanks to the set of pinions 51 and 52 and to the rack 53.

Indeed, the seat 10 includes two first pinions 51 fastened to the backrest portion 12 on both of its lateral sides. These first pinions 51 consist of circle portions, and tilting of the backrest portion 12 causes rotation thereof. Each first pinion 51 is coupled to a second pinion 52 fastened to the sitting portion 11 and mounted on the rack 53. The rotation of the two second pinions 52, induced by the rotation of the two first pinions 51, causes rolling thereof on the racks 53 and therefore the translation of the sitting portion 11.

Conversely, the translation of the sitting portion 11 causes rolling of the second pinions 52 on the racks 53, and therefore the rotation of the first pinions 51 and of the backrest portion 12 which is secured thereto.

Thus, the pinions 51 and 52 are sized so as to make an abscissa of the sitting portion 11 on the longitudinal direction of the seat 10 match with each inclination of the backrest portion 12, and to obtain a conversion movement at speeds suited to the use of the passengers.

In particular, the second pinions 52 are staggered and each comprises a large-diameter wheel 521, cooperating with the associated first pinion 51, and a small-diameter wheel 522 cooperating with the associated rack 53.

To sum up, the sitting portion 11 is mounted on the fixed structure of the seat 10 through a slide connection materialised by a pinion-rack system, and its movement is coupled to the movement of the backrest portion 12 for a simultaneous actuation.

Of course, this design is not restrictive and could be replaced by other designs ensuring the same function.

When it is actuated, the unlocking lever 15 allows freeing the movement of the sitting portion 11 and of the backrest portion 12 so that the passenger could move the seat into the desired position. In other words, the unlocking lever 15 remains in a default movement blocking position.

The unlocking lever 15 may be made in different ways, in particular by a blocking element connected to one or more position holding spring(s).

Since the passengers do not have the same size, and despite a dynamic sizing suited to most passengers according to a statistically established average, the conversion is assisted by the compensating means 54.

Indeed, the compensating means 54 allow assisting the passenger in the rotation of the backrest portion 12, at least during the phases requiring efforts the most.

According to the illustrated aspect, the compensating means 54 consist of gas springs wherein the free ends of their rod and of their chamber are respectively fastened to a sitting structure 11 and to a first pinion 51.

Gas springs are gas cylinders especially designed to supply a constant and controlled compressive force to address the specific need of assistance in conversion of the seat, in contrast with conventional cylinders whose force varies linearly. These gas springs are manufactured based on high-quality materials, such as stainless steel or aluminium, to offer durability and corrosion resistance.

In each gas spring 54, the cylinder contains a wound spring and a pressurised gas, generally nitrogen, which is compressed when the cylinder is retracted. When the cylinder is released, the gas expands and pushes the piston, supplying a constant and controlled force for a smooth and completely safe operation.

Therefore, during the conversion of the seat 10 into the laid position, the gas spring 54 stores potential energy that it restitutes afterwards during the reverse conversion. Given the attachment of each gas spring 54, the pressing force is exerted on the first pinions 51 with a lever arm that is favourable to cause rotation of said first pinions relative to the tilt axis 121 of the backrest portion 12.

FIG. 3 clearly shows the positioning of the two support points of the compensating means 54, one being on a structure of the sitting portion 11 and the other on the first pinion 51. Hence, the compensating means 54 act on the rotational relative movement of the backrest portion 12 relative to the sitting portion 11 during conversions into the sitting position (fold-up of the backrest portion).

The blocking means 55, visible in FIG. 2, allows holding the seat 10 in any position between the sitting position and the laid position.

According to the illustrated aspect, the blocking system 55 is a linear positioner. It consists of a mechanical locking device used to supply a positive holding force on a linear cylinder, thereby preventing any undesirable movement of the cylinder when the latter is in the closed position.

The blocking means 55 may be used with a variety of linear cylinders, in particular pneumatic or hydraulic cylinders, and includes a case made into two portions, which are connected by a threaded rod and a worm screw. When the worm screw is rotated, the two portions of the case move towards or away from the end of the cylinder, thereby supplying a holding force on the cylinder to hold it in the closed position.

The linear positioner used in the illustrated example enables an accurate positioning, but has some functional backlash. Insofar as this device type is not mandatory, other devices may be used for the same technical effect of holding the seat 10 in all of its possible positions.

The blocking means 55 is placed at its two ends in two support elements, a lower support 551 and an upper support 552, respectively fastened to the sitting portion 11 and to the backrest portion 12.

Of course, besides the compensating means 54 and the blocking element 55, the manual conversion mechanism 50 may include other optional elements.

FIG. 4 schematically illustrates the kinematics of the seat 10, according to a profile view like that of FIG. 3, and allows easy understanding of its operation.

The mechanism 50 further comprises another compensating means 56, to assist the passenger in the translation of the sitting portion 11, a setting means 57 to set the intervention position of said compensating means, a means for setting the inclination of the sitting portion 58 in particular to incline it further in the rest position and to align it horizontally in the laid position, and a speed limiter 59 which is activated in case of off-load release (without the passenger).

The translation compensating means 56 comprises at least one tensile spring fastened between the fixed portion of the seat and the sitting portion 11. Conversion into the laid position allows expanding the compensating means which, thanks to its biasing force, assists the passenger during the reverse conversion, i.e. into the sitting position.

Hence, the setting means 57 allows setting the maximum expansion distance of the compensating means 56 and therefore the intensity of the biasing force exerted on the sitting portion 11, or completely disengaging the compensating means 56 so that it is not activated during the conversion. The larger this expansion distance, the greater the biasing force will be.

To this end, the setting means 57 may include a stop which is movable via a rod.

It should be noted that the translation compensating means 56 is particularly intended for the heaviest passengers, and that some light passengers could get rid of it.

FIG. 5 illustrates an example of a compensating means 56 and its setting means 57 which may be used in the conversion mechanism 50.

According to this example, the compensating means 56 comprises a tensile spring 561 mounted between a first support 562 and a second support 563, both fastened to the fixed structure of the seat 10, and a rod 564 connecting one end of said spring to the second support 563.

The rod 564 is slidably mounted on the second support 563 and comprises a stop 5641 at its free end which is engaged by the setting means 57.

To this end, the setting means 57 comprises a hook 571 fastened to the sitting portion 11, which engages the stop 5641 of the rod 564 to expand the spring 561.

The hook 571 may be multiple, by including several recesses, and engage the stop 5641 at different distances, this allows dynamically setting the compensating means 56 in particular by a cursor or the like accessible to the crew and/or to the passenger.

The setting may also be automatic depending on the weight of a passenger properly seated, the heaviest passengers require a greater biasing force of the compensating means 56.

The setting means 57 may also include a bar 572 fastened at the end of the spring 561, opposite to the end connected to the rod 564, and whose position is adjustable in the first support 562.

Furthermore, the seat 10 includes a safety system, not illustrated, to avoid any brutal return of the seat in the absence of passenger.

After many tests, the Inventors have concluded that a 6° angle for the ramp 16 offers a good trade-off to enable the weight of the passenger concentrated in the bottom of his/her body to rise during a conversion of the seat into the laid position.

Nonetheless, other values of this angle may be adopted. Indeed, the angle α depends on parameters such as the incidence of the aircraft in flight and the power of the used compensating means. This angle should be strictly positive, and preferably comprised between 1° and 10°.

Hence, the seat 10 thus described is convertible between the different positions in a fully manual manner without any external energy input.

FIG. 6a illustrates a passenger P occupying the seat 10 in the sitting position in his/her seat unit 100, which unit including a separation shell 40.

FIG. 6b is a view of FIG. 6a without a portion of the separation shell, to reveal the manual conversion mechanism 50. The passenger P has his/her right hand set on the unlocking lever of the seat 10 and is about to convert said seat into the rest or laid position.

FIG. 7 illustrates the seat 10 in the sitting position (a), in the rest position (b) and in the laid position (c), revealing the essential elements of the manual conversion mechanism to understand their movements relative to one another. More particularly, between the sitting position and the laid position, the second pinion 52 covers the rack 53 from one end to another, and the first pinion 51 performs about one quarter-turn about the tilt axis of the backrest portion 12.

It arises from the present description that some non-essential elements of the convertible seat could be modified, replaced or removed yet without departing from the scope of the invention defined by the claims hereinafter.

What is claimed is:

1. A convertible seat for a passenger of an aircraft including a sitting portion and a backrest portion movable between a sitting position and a laid position, characterised in that the convertible seat includes a mechanism for manual conversion between said positions, which is actuated by a physical action of the passenger by means of an unlocking lever, without any electrical energy input, in that said mechanism comprises load-compensating means to assist the passenger during the conversion of the seat.

2. The seat according to claim 1, characterised in that the convertible seat does not comprise any motor-driven mechanism to actuate any movement of the sitting portion or of the backrest portion.

3. The seat according to claim 1, wherein the mechanism comprises, on each lateral side of the seat, a first pinion fastened to the backrest portion, a second pinion coupled to the first pinion and a rack cooperating with the second pinion to drive the sitting portion in translation under the effect of the rotation of the first pinion.

4. The seat according to claim 3, wherein each second pinion is staggered and comprises a large-diameter wheel coupled to the respective rack and a small-diameter wheel coupled to the respective first pinion.

5. The seat according to claim 1, wherein the load-compensating means comprise a gas spring fastened between the sitting portion and the backrest portion to assist the passenger in a rotational movement of said backrest portion.

6. The seat according to claim 1, wherein the load-compensating means comprise at least one tension spring fastened between the sitting portion and a fixed structure of the seat to assist the passenger in a translational movement of said sitting portion.

7. The seat according to claim 1, wherein the mechanism further comprises a blocking means fastened between the sitting portion and the backrest portion to hold the seat at any position between the sitting position and the laid position.

8. The seat according to claim 7, wherein the blocking means is a linear positioner.

9. A seat unit for a passenger of an aircraft, characterised in that the seat unit comprises the seat according to claim 1, an extension element comprising an ottoman and a separation shell.

10. An aircraft characterised in that the aircraft comprises at least one seat unit according to claim 9.

* * * * *